United States Patent

Somers et al.

[11] Patent Number: 5,284,572
[45] Date of Patent: Feb. 8, 1994

[54] METHOD OF PRODUCING A THIN-FILM MAGNETIC HEAD UTILIZING ELECTROPLATING

[75] Inventors: Gerardus H. J. Somers; Antonius B. Voermans, both of Eindhoven, Netherlands

[73] Assignee: U.S. Philips Corporation, New York, N.Y.

[21] Appl. No.: 664,164

[22] Filed: Mar. 4, 1991

[30] Foreign Application Priority Data

Mar. 9, 1990 [NL] Netherlands .................. 9000546

[51] Int. Cl.$^5$ .................. C25D 5/02; G11B 5/39
[52] U.S. Cl. .................. 205/119; 29/603; 205/96; 205/122; 205/223
[58] Field of Search .......... 205/122, 119, 183, 184, 205/186, 191, 192, 223, 96; 427/131; 29/603

[56] References Cited

U.S. PATENT DOCUMENTS

| | | | |
|---|---|---|---|
| 3,921,217 | 11/1975 | Thompson | 360/113 |
| 4,239,587 | 12/1980 | Koel et al. | 156/659.1 |
| 4,402,801 | 9/1983 | Omata et al. | 205/119 |
| 4,436,593 | 3/1984 | Osborne et al. | 205/119 |

OTHER PUBLICATIONS

D. W. Chapman, A New Approach to Making Thin Film Head–Slider Devices, IEEE Transactions on Magnetics, vol. 25, No. 5, Sep. 1989, pp. 3686–3688.

*Primary Examiner*—John Niebling
*Assistant Examiner*—William T. Leader
*Attorney, Agent, or Firm*—Norman N. Spain

[57] ABSTRACT

A method of producing a thin-film magnetic head on a carrier (1) comprising depositing an electrically conducting plating-base (2) and electroplating flux conductors (4a, 4b) and a magnetically insulating layer (8) on the plating-base. This provides a planar structure on which an electrically insulating layer (9) and a magnetoresistance element (10) are applied. The plating-base (2) also constitutes the gap layer.

4 Claims, 2 Drawing Sheets

METHOD OF PRODUCING A THIN-FILM MAGNETIC HEAD UTILIZING ELECTROPLATING

BACKGROUND OF THE INVENTION

The invention relates to a method of producing a thin-film magnetic head, starting from a magnetic carrier, on which a first non-magnetic layer is deposited, depositing spatially separated flux conductors, and at least between the flux conductors depositing a second non-magnetic layer, whereafter on the flux conductors and the second non-magnetic layer an electrically insulating layer is deposited on which a magneto-resistance element is applied. The invention also relates to a thin-film magnetic head which includes a magnetic carrier on which a first non-magnetic layer is present on which flux conductors and a second non-magnetic insulating layer are located, this second non-magnetic layer being arranged at least between the flux conductors, there being present on the flux conductors and the second non-magnetic layer an electrically insulating layer on which a magneto-resistance element is provided at least facing the second magnetic insulating layer.

A method and a thin-film magnetic head as described in the opening paragraph are disclosed in the Japanese Patent Application 62-246115A. In the prior-art magnetic head the magneto-resistance element bridges a leading and a trailing flux conductor and the magneto-resistance element is located outside the magnetic yoke constituted by the flux conductors and a carrier. This significantly improves the efficiency of the thin-film magnetic head compared with a magnetic head in which the magneto-resistance element is located inside the yoke between the carrier and the flux conductors. In the prior-art method, the flux conductors are deposited by means of sputtering and are structured by an ion etching procedure. In such a method a magnetic layer which is first deposited, is coated by a shielding layer, for example a photoresist. This shielding layer is thereafter structured, for example by exposing the layer selectively to light. By doing so the photoresist is developed, whereafter the exposed portion is removed. Thereafter the magnetic layer can be structured by means of the ion etching procedure. The prior-art method has the disadvantage that a relatively large number of manufacturing steps must be carried out for the formation of the flux conductors, causing the method to be time-consuming and consequently rather expensive.

SUMMARY OF THE INVENTION

The invention has for an object to provide a method of producing a thin-film magnetic head by means of which a thin-film magnetic head having good magnetic properties and a very simple head structure may be obtained in a simple and fast manner. For this purpose the method according to the invention, is characterized, in that the first non-magnetic layer is formed by depositing an electrically conducting plating base on the carrier. This renders it possible to apply the flux conductors during the further method by electroplating, for which a fewer number of process steps are required than in the prior-art method.

As the plating-base also constitutes the gap layer, it may be relatively thick, which is advantageous for the electroplating process and there are no limitations to the choice of the gap length. In this respect the method differs from prior-art electroplating processes in which the gap length is enlarged because of the fact that an electrically conducting and magnetically non-conducting layer, serving as the basis, for the electroplating process, is deposited on the first non-magnetic layer. It is also known to deposit an electrically as well as a magnetically conducting layer on the first non-magnetic layer. This does not put any limitations to the choice of the gap length, but such a layer may disadvantageously influence the magnetic properties of the flux conductors. An additional advantage of the method according to the invention is that the plating-base can also function as a bias winding for driving the magneto-resistance element.

DETAILED DESCRIPTION OF THE INVENTION

Figure 1:
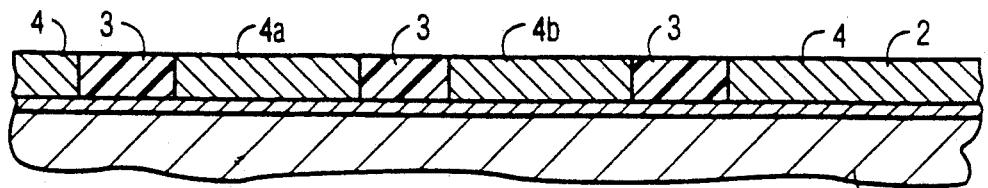
FIGS. 1 to 5 are cross-sectional views of intermediate products during the method according to the invention.

An embodiment of the method according to the invention, is characterized, in that the flux conductors are deposited on the plating-base by electroplating. Depositing the flux conductors by means of electroplating requires less time and is therefore also cheaper than forming the flux conductors by means of sputtering and structuring.

An embodiment of the method according to the invention, which is suitable for growing the flux conductors by means of electroplating, is characterized, in that photolacquer resist walls are deposited on the plating-base before the flux conductors are applied, whereafter magnetic layer portions are applied by electroplating at least between the photolacquer resist layers on the plating-base for the formation of at least the flux conductors, after which the photolacquer resist walls are removed.

For a structure in which the magneto-resistance element is located outside of the yoke, it is necessary for the space between the leading and the trailing flux conductors to be planarized. This may, for example, be achieved by depositing an excess of insulating material by means of sputtering, evaporating or CVD (chemical vapour deposition), whereafter the superfluous material is removed by etching. A further method, which is used in the prior-art method, is filling up the space between the flux conductors by means of a spin-coating procedure and depositing the electrically insulating layer on the flux conductor by means of this same procedure. These techniques for the deposition of the electrically insulating layer are time-consuming and therefore rather expensive.

An embodiment of the method according to the invention, in which the said disadvantages do not occur, is characterized, in that the second magnetically insulating layer is formed by depositing an electrically conducting magnetically insulating layer on the plating-base at least between the flux conductors, by means of electroplating. This provides the advantage that a flat layer having a constant thickness grows during the electroplating process. An additional advantage is the speed of the electroplating process. A further advantage is that the electrically floating flux conductors of the prior-art magnetic head are now electrically interconnected, which results in a reduced electrical noise caused by static charging of the flux conductors due to friction with a magnetic medium and reduces the risk of ESC (electro-static discharge).

A practical embodiment of the method according to the invention, suitable for growing the second magnetically insulating layer via electroplating, is characterized, in that before the photolacquer resist walls are removed, an electrically insulating shielding layer is deposited at least on the flux conductors, whereafter the assembly of magnetic layer portions, shielding layer and photolacquer resist layers are structured such, that only the flux conductors with a portion of the shielding layer upon it remains, after which further photolacquer resist layers are deposited on the plating-base, whereafter the electrically conducting magnetically insulating layer is deposited at least between the flux conductors and the further photolacquer resist layers by electroplating to form the second magnetically insulating layer and whereafter the said portion of the shielding layer and the further photolacquer resist walls are removed.

A further practical embodiment of the method according to the invention, is characterized, in that during the deposition of the magnetic layer portions on the plating base, magnetic layers, in addition to the flux conductors, are also grown by electroplating on the plating base after which the shielding layer is deposited on the magnetic layer portions and the photolacquer resist walls and on which shielding layer at least in the region of the flux conductor photolacquer resist layers are deposited, after which during structuring the photolacquer resist layers also are removed. The latter method has for its advantage that the magnetic layer portions are grown by electroplating over a larger surface area than in the embodiments previously described. Consequently, the electric current will be distributed more uniformly over the surface during the procedure, causing the growth to be achieved more uniformly and with an increased degree of controllability.

As far as the thin-film magnetic head is concerned, according to the invention it is characterized, in that the first magnetically insulating layer is an electrically conducting plating-base. As the transducing gap is formed by only one layer, a well-defined gap length is obtained. A suitable electrically conducting plating-base is, for example, an Au layer.

A further embodiment of the thin-film magnetic head according to the invention, is characterized, in that the second magnetically insulating layer consists of an electrically conducting material. Thus it is possible to form the second magnetically insulating layer as an electroplated layer. By making the thickness of the second magnetically insulating layer equal to the thickness of the flux conductors, a flat layer is obtained, which during production is advantageous for the deposition of the magneto-resistance element. A suitable material for the second magnetically insulating layer is Cu.

The invention will now be described in greater detail with reference to embodiments of the method and o f the thin-film magnetic head shown in the accompanying Figures by way of example.

An embodiment of the method according to the invention employs, as a magnetic carrier which also conducts the magnetic flux, a ferrite substrate. On this carrier 1 a plating-base 2 of an electrically conducting and a magnetically non-conducting material is deposited, for example an Au base. Photolacquer resist walls 3 are deposited on the plating-base 2, after which the magnetic layer portions 4, 4a and 4b, for example of NiFe, are grown by means of electroplating on the plating-base 2. FIG. 1 is a cross-sectional view perpendicular to the carrier 1 of the intermediate product thus obtained. In addition to the flux conductors 4a and 4b (formed from said magnetic layer portions 4a and 4b), the magnetic layer portions include also additional magnetic layers 4 for obtaining a large surface area, so that during the growing operation an improved distribution of the electric current in the plating-base 2 is obtained and the growth is achieved with greater control.

Figure 2:
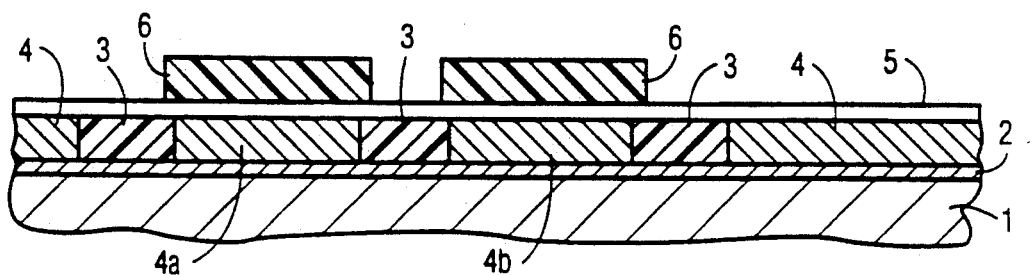
Figure 3:
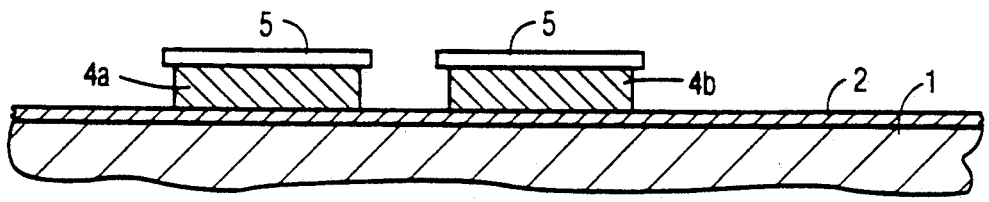

A shielding layer 5, for example a quartz layer or a photolacquer resist layer is applied on this intermediate product, portions of these layers functioning as an electrical insulation of the flux conductors 4a and 4b in a later stage of the method. Photolacquer resist layers 6 which function as a barrier during structuring of the composite layer are applied on the assembly of magnetic layer portions 4, 4a and 4b, photolacquer resist walls 3 and the shielding layer 5. FIG. 2 shows an intermediate product previous to structuring and FIG. 3 shows the result after structuring. This structuring may for example be carried out by means of a wet chemical etching process. During structuring, the photolacquer resist walls 3, the additional magnetic layers 4 and the shielding layer 5 are partly removed. The shielding layer 5 must remain on the flux conductors 4a and 4b to prevent unwanted layers from being formed during a subsequent electroplating operation on the flux conductors in the further course of the method.

Figure 4:
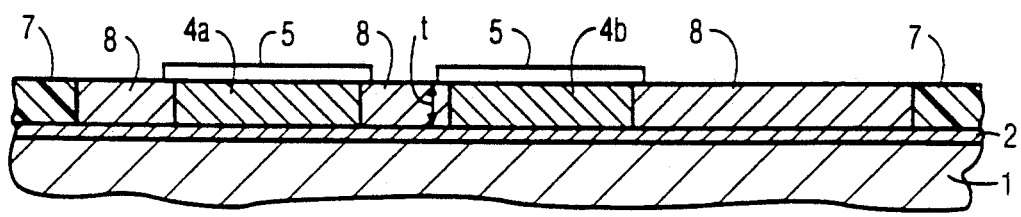
Figure 5:
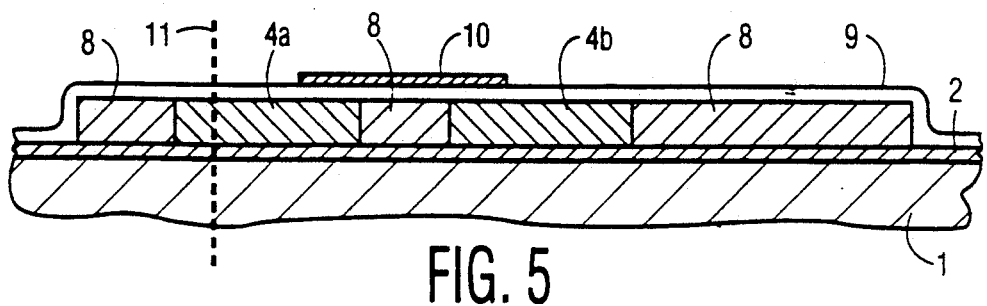
Figure 7:
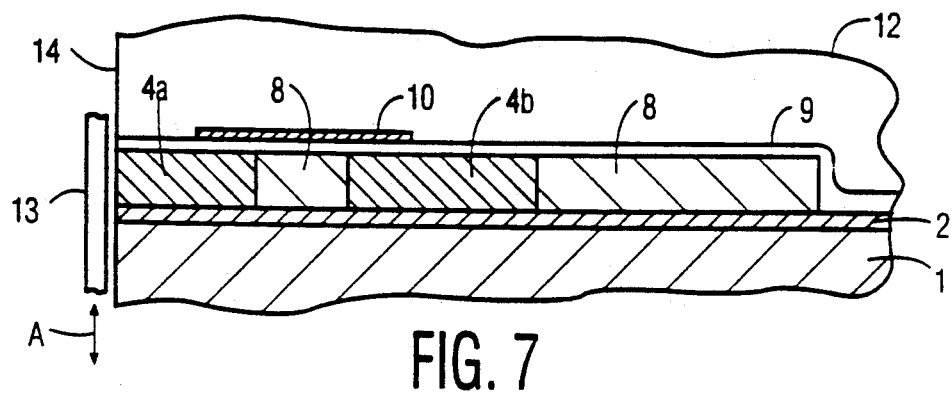
FIG. 7 is a cross-sectional view of a first embodiment of the magnetic head according to the invention.

During the latter electroplating process a second non-magnetic layer 8 is deposited. It is already sufficient to deposit this layer 8 only between the flux conductors 4a and 4b. To obtain a more uniform distribution of the current and consequently a process which can be controlled to an improved extent, the layer 8 is preferably grown over a larger surface area. Further photolacquer resist walls 7 are first deposited on the plating-base 2 to define the surface on which the second non-magnetic layer is deposited. Thereafter the non-magnetic layer 8 is deposited until it has obtained a dimension t in a direction perpendicular to the carrier 1 equal to that of the flux conductors, as shown in FIG. 4. After removal of the shielding layer portions 5 and the further photolacquer resist walls 7 a planarized structure remains, as is shown in FIG. 5. An electrically insulating layer 9 and a magneto-resistance element 10 are deposited on this structure one after the other. The broken line 11 in the drawing indicates the location of the head face to be formed. This head face 14, see FIG. 7, is obtained after grinding of the intermediate product shown in FIG. 5. Prior to grinding a filler layer 12, for example of $SiO_2$, is deposited on the magnetic head structure. FIG. 7 shows the magnetic head obtained by means of the method described in the foregoing, the head face 14 cooperating with a schematically shown magnetic information carrier 13 which is movable in the directions indicated by the double arrow A.

Figure 8:
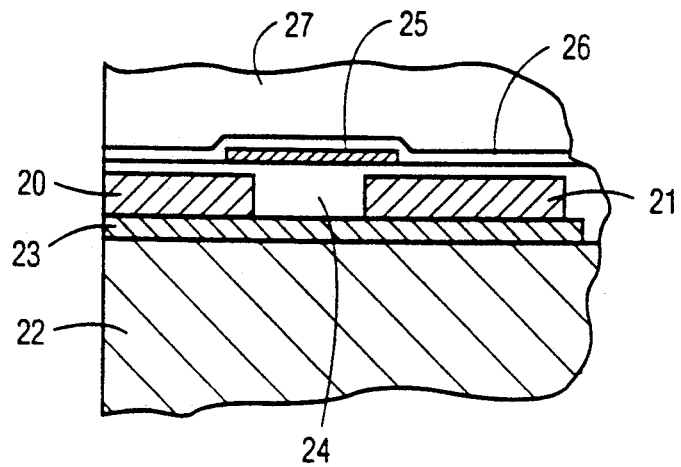
FIG. 8 is a cross-sectional view of a second embodiment of the magnetic head according to the invention.

FIG. 8 shows another embodiment of a magnetic head according to a second method, which slightly deviates from the method described in the foregoing. In this second method only the flux conductors 20 and 21 are grown by electroplating. For this purpose a plating layer 23 is deposited on a magnetic carrier 22. The second non-magnetic layer and the electrically insulating layer are formed together by an insulating layer 24 which is both mechanically and electrically insulating and is made of, for example, SiO$_2$. This planarized insulating layer 24 is deposited for example by sputtering or CVD (chemical vapor deposition), after which the superfluous material is removed by etching. A magnetoresistance element 25, a further insulating layer 26 and a filler layer 27 are arranged one after the other on this insulating layer 24.

Figure 6:
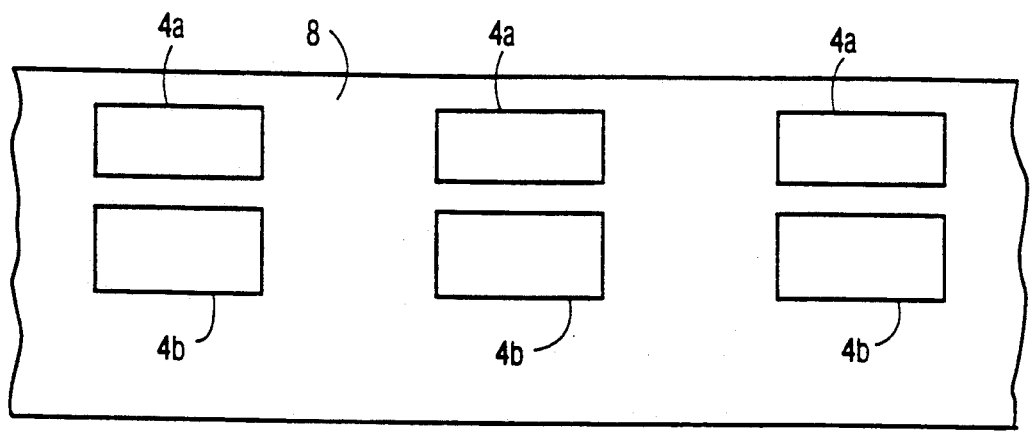
FIG. 6 is a plan view of the planarized structure of flux conductors and a magnetically insulating layer of an intermediate product.

It should be noted that the invention is not limited to the embodiments shown here, but that other embodiments are also within the scope of the invention. Thus, the carrier need te not be composed entirely of magnetic material. A carrier assembled from a non-magnetic substrate with a magnetic layer deposited thereon is alternatively possible. An embodiment in which the carrier plane of the carrier is not magnetic also belongs to the possibilities. The carrier may, for example, include a magnetic substrate, having writing windings arranged thereupon which are covered with a non-magnetic layer, on which the plating-base is then deposited. A magnetic head structure, having several transducing gaps next to each other is also possible, FIG. 6 showing an intermediate product thereof.

We claim:

1. A method of producing a thin film magnetic head including the steps of depositing an electrically conductive non-magnetic plating base (2) on a magnetic carrier (1), depositing magnetic layer portions comprising spatially separated flux conductors (4a, 4b) on said plating base by electroplating, depositing a non-magnetic layer (8) between said flux conductors on said plating-base by electroplating to thereby isolate said flux conductors one from another, depositing an electrically insulating layer (9) on said non-magnetic layer and said flux conductors and depositing a magnetic resistance layer (10) on said electrically insulating layer.

2. A method as claimed in claim 1, wherein spatially separated photolacquer resist walls (3) are deposited on the plating-base (2), flux conductors (4a, 4b) are deposited by electroplating on the plating-base at least between the spatially separated photolacquer resist walls and the photolacquer resist walls are then removed.

3. A method as claimed in claim 2 wherein before removal of said spatially separated photolacquer resist walls (3), an electrically insulating shielding layer (5) is deposited, at least on said flux conductors; said spatially separated photolacquer resist walls and any of said electrically insulating shielding layer not present on said flux conductors are removed from said plating-base, spatially separated further photolacquer resist walls (7) are then deposited on said plating-base, said non-magnetic layer (8) is then deposited by electroplating on said plating-base at least between said further photolacquer resist walls and remaining portions of said shielding layer and said further photolacquer resist walls are removed.

4. A method as claimed in claim 3, characterized in that during the deposition of the flux conductors (4a, b) on the plating-base (2) further magnetic layers (4) are grown by electroplating in addition to the flux conductors, whereafter the shielding layer (5) is deposited on the flux conductors, the further magnetic layers and the photolacquer resist walls (3), on which shielding layer (5), at least in the region of the flux conductors, photolacquer resist layers (6) are deposited, whereafter the shielding layer (5) not present on the flux conductors, the photolacquer resist walls (3), the further magnetic layers are removed and also the photolacquer resist layers (6) are removed.

* * * * *